Dec. 22, 1931.  L. C. WETZEL  1,837,601
ANTIFRICTION BEARING
Filed Oct. 5, 1925
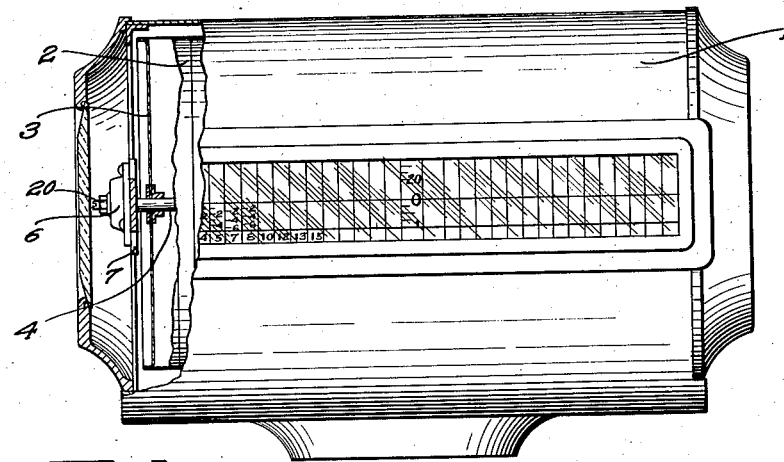
Fig. I.
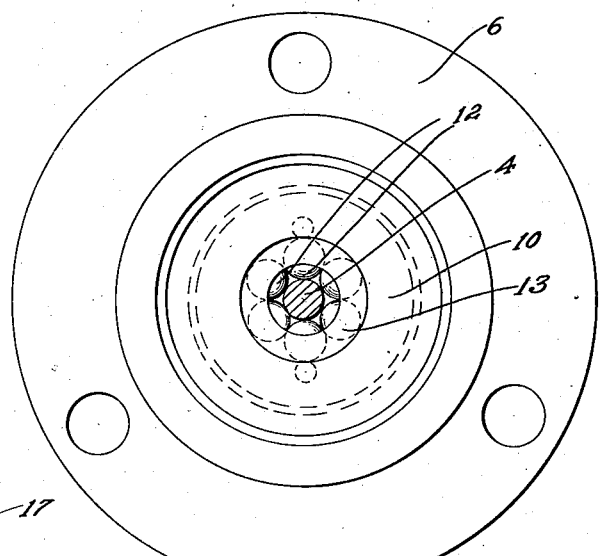
Fig. II.
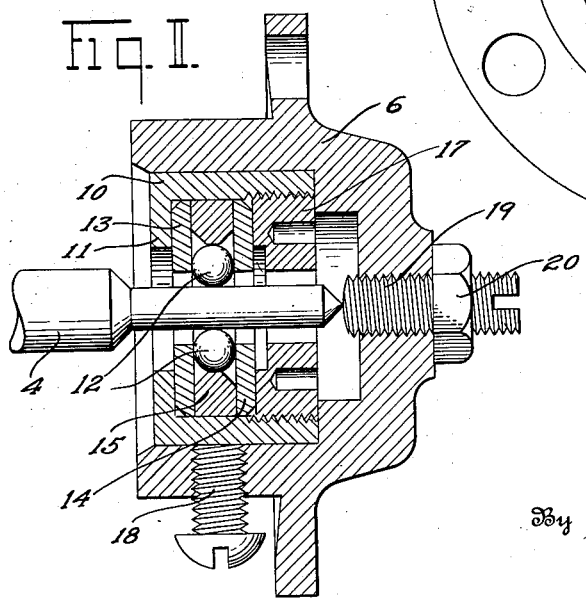
Fig. III.
Inventor
Lewis C. Wetzel
By C. O. Marshall
Attorney Patented Dec. 22, 1931

1,837,601

UNITED STATES PATENT OFFICE

LEWIS CALVIN WETZEL, OF TOLEDO, OHIO, ASSIGNOR TO TOLEDO SCALE MANUFACTURING COMPANY, OF TOLEDO, OHIO, A CORPORATION OF NEW JERSEY

ANTIFRICTION BEARING

Application filed October 5, 1925. Serial No. 60,398.

This invention pertains to anti-friction bearings for shafts, and particularly to ball races and means for mounting the same.

One of the principal objects of the invention is to provide a bearing in which the races are constructed in the form of rings and disks to facilitate manufacture and assembly.

Another object is the provision of an antifriction ball bearing which may be easily assembled and one in which slight inaccuracies in the parts do not materially affect the successful operation of the bearing.

Another important object is to provide a bearing which can be disassembled and reassembled for cleaning without danger of getting it out of adjustment.

Another object is to produce an annular bearing in which the balls are absolutely free of side pressure.

Another object is the provision of a cageless bearing which is free from wedging pressure and in which the balls will remain in place when the shaft is withdrawn.

Another object is to provide means for catching such dirt or foreign matter as may find its way in the bearing.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a chart housing of a well known type of weighing scale, parts being broken away and parts in section;

Figure II is an enlarged vertical sectional view through the bearing of my invention;

Figure III is an end view of the bearing shown in Figure II.

Referring to the drawings in detail, I have shown the bearing of my invention as supporting the chart shaft of a weighing scale of the cylinder type, and it is particularly adapted for use in scales and other precision instruments in which friction must be eliminated to the last possible degree, but it is to be understood that the invention is also adapted for use in other types of machines and that I contemplate its use wherever it may be found applicable.

The portion of the scale illustrated comprises a substantially cylindrical casing 1 within which is supported the weight indicating and price computing chart 2 mounted upon suitable skeleton spiders 3 fixedly secured to a shaft 4. The shaft is carried at each end by means of an anti-friction bearing of my invention, which will now be described in detail.

The bearing proper is mounted in a circular casing 6 carried by the chart casing 1 in any suitable manner, the casing 6 being provided with a bore which snugly receives a hollow cylinder 10, one end of the cylinder having a shoulder 11 which forms a seat for the bearing races. The balls 12 of the bearing are maintained in their proper locus of movement by means of races 13, 14 and 15. The races 13 and 14 are in the form of circular disks, preferably constructed of hardened steel, the surfaces of which are ground to insure a smooth raceway for the balls 12. The ball race 15 is in the form of an annulus which is positioned between the circular disks 13 and 14 and is of slightly greater width than the diameters of the bearing balls so that the balls may be free to operate in the raceway with the least possible friction. The inside edges of the race 15 are beveled to provide recesses for the purpose of catching such dust and foreign matter as may find its way into the bearing. This is an important feature, since the indicating mechanism which turns on the bearings is so sensitive that it is affected by the least accumulation of dirt.

The internal wall of the casing 10 is threaded to receive a clamping disk 17. The inner surface of this disk engaging the surface of the disk 14 serves to retain the annular race 15 and disk races 13 and 14 in the casing 10. The casing 10 is secured in the housing 6 by means of a screw 18. An end thrust is provided for the end of the chart shaft 4 comprising a hardened screw 19 threaded into an opening in the housing 6 and secured against further relative movement by means of a lock nut 20. There is thus no end thrust on the bearings and the contact of the balls with the disks 13 and 14 is so light that the friction is practically nil.

It will be obvious that the parts of my anti-friction bearing may be easily and inexpensively manufactured and assembled, that the efficiency of the bearing is high, and that there is no possibility of wedging action between the balls and the races and no liability of its getting out of adjustment even if it be disassembled for cleaning.

The embodiment of my invention herein illustrated and described is to be regarded as illustrative only, and it is to be understood that the invention is susceptible to variation, modification and change within the spirit and scope of the subjoined claims.

Having described my invention, I claim:

1. In a device of the class described, in combination, a pair of spaced disk-like ball race members, an annular race member positioned between said disk-like members, the inner surface of said annular race member being substantially cylindrical and its inner edges being beveled, and means for securing said ball race members together.

2. In a device of the class described, in combination, a pair of disk-like ball race members, an annular ball race member interposed between said disk-like members, the sides of said disk-like members facing each other forming plane thrust bearing surfaces and the inner surface of said annular race member forming a cylindrical bearing surface, the inner edges of said annular ball race members being beveled, and means for holding said bearing members in assembled relation whereby the cylindrical surface of said annular member and the plane surfaces of said disk-like members form a channel with the beveled edges forming grooves in the bottom of such channel.

LEWIS CALVIN WETZEL.